United States Patent
Bahadorani et al.

(10) Patent No.: US 11,746,238 B1
(45) Date of Patent: Sep. 5, 2023

(54) WATER HYACINTH FIBER-BASED MATERIALS

(71) Applicant: In-Between International S.A., Braine-l'Alleud (BE)

(72) Inventors: Rebeka Bahadorani, Braine-l'Alleud (BE); Richard Thommeret, Kraainem (BE)

(73) Assignee: IN-BETWEEN INTERNATIONAL S. A., Braine-l'Alleud (BE)

( * ) Notice: Subject to any disclaimer, the term of this patent is extended or adjusted under 35 U.S.C. 154(b) by 0 days.

(21) Appl. No.: 17/701,210

(22) Filed: Mar. 22, 2022

(51) Int. Cl.
*C08L 97/02* (2006.01)

(52) U.S. Cl.
CPC .......... *C08L 97/02* (2013.01); *C08L 2201/06* (2013.01); *C08L 2205/03* (2013.01); *C08L 2205/16* (2013.01)

(58) Field of Classification Search
CPC .. C08L 97/02; C08L 2201/06; C08L 2205/03; C08L 2205/16
See application file for complete search history.

(56) References Cited

U.S. PATENT DOCUMENTS

| | | | |
|---|---|---|---|
| 4,222,217 A | 9/1980 | Brown | |
| 5,487,258 A | 1/1996 | McNabb | |
| 2006/0150493 A1 | 7/2006 | Van Deventer | |
| 2019/0208704 A1 | 7/2019 | Bahadorani et al. | |

FOREIGN PATENT DOCUMENTS

| | | | | |
|---|---|---|---|---|
| CN | 1268305 A | 10/2000 | | |
| CN | 2749243 Y | 1/2006 | | |
| CN | 102689337 A | 9/2012 | | |
| CN | 202857322 U | 4/2013 | | |
| CN | 103444398 A | 12/2013 | | |
| CN | 104012523 A | 9/2014 | | |
| CN | 105493742 A | 4/2016 | | |
| CN | 106188654 A | 12/2016 | | |
| CN | 106977790 A | * | 7/2017 | |
| GB | 369263 A | 3/1932 | | |
| PH | 2019000436 A | 6/2021 | | |
| PH | 2020050316 U | 10/2021 | | |
| WO | 9221227 A2 | 12/1992 | | |
| WO | WO-2013029018 A1 | * | 2/2013 | ............... C08L 1/00 |

OTHER PUBLICATIONS

Abd El-Aziz El-Wakil et al., "Mechanical and Acoustical Properties of *Eichhornia crassipes* (Water Hyacinth) Fiber-Reinforced Styrene Butadiene Rubber," 42 Polymer Composites 3732-45, first published May 12, 2021.*
English-language translation of CN 106977790 obtained from USPTO PE2E Search database on Jul. 7, 2022, 9 pages.*
Supri et al. (Polymer Plastics Technology and Engineering, 50, 898-906, 2011) (Year: 2011).*
Pasilo et al. (Advances in Science, Technology, and Engineering Systems Journal, vol. 4, No. 6, 91-93, 2019) (Year: 2019).*
Sumrith et al. (Journal of Polymers and the Evironment, 2020, 28, 2749-2760) (Year: 2020).*
Chong et al. (Radiation Physics and Chemistry 79 (2010) 906-911) (Year: 2010).*
Thongkanluang et al. (SNRU Journal of Science and Technology 10(1) 2018, 52-57) (Year: 2018).*

* cited by examiner

*Primary Examiner* — Liam J Heincer
(74) *Attorney, Agent, or Firm* — Craft Chu PLLC; Andrew W. Chu

(57) ABSTRACT

A material includes a water hyacinth fiber and a substance mixed with the water hyacinth fiber. The substance is not polyurethane. A concentration of the substance in the material is in a range of 0 to 20%.

10 Claims, 5 Drawing Sheets

US 11,746,238 B1

WATER HYACINTH FIBER-BASED MATERIALS

TECHNICAL FIELD

The present disclosure relates to water hyacinth fiber-based materials, for example, a material including a water hyacinth fiber mixed with a substance.

BACKGROUND

Water hyacinth, or "*Eichhornia crassipes*," is a freshwater aquatic plant. The plant may include, among other components, about 45% cellulose, 15% hemicellulose, and 2.5% lignin. The plant may have a water content in a range of 90 to 98%. A calorific value of the plant may be in a range of 14 to 15 MJ/kg, which is close to that of wood. The water hyacinth fibers may be defibrated using techniques such as a hammer mill, a disc mill, or the like. A humidity level for the defibration may be in a range of 5 to 25%. The defibration allows the length and width of the water hyacinth fibers to be adapted from a dried plant.

SUMMARY

According to one embodiment, a material is disclosed. The material may include a water hyacinth fiber. The material may further include a substance mixed with the water hyacinth fiber. The substance may not be polyurethane. A concentration of the substance in the material may be in a range of 0 to 20%.

According to another embodiment, a method for preparing a material including water hyacinth fibers is disclosed. The method may include mixing a water hyacinth with a substance, resulting a mixture of the water hyacinth fiber and the substance. The substance may not be polyurethane. A concentration of the substance in the mixture may be in a range of 0 to 20%. The method may further include heating the mixture at a temperature. The method may also include pressing the mixture under a pressure over a time period. The method may further include cooling the mixture, resulting in the formation of the material.

According to yet another embodiment, a product including water hyacinth fibers is disclosed. The product may include a material that further includes a water hyacinth fiber and a substance mixed with the water hyacinth fiber. The substance may not be polyurethane. A concentration of the substance in the material may be in a range of 0 to 20%.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Aspects of the present disclosure relate to water hyacinth fiber-based materials, for example, a material including a water hyacinth fiber mixed with a substance. The incorporation of the substance into the water hyacinth fiber may enhance the physical and/or mechanical properties of the water hyacinth fiber. The material may be used to manufacture a product. The presence of the substance in the water hyacinth fiber may thus also enhance the physical and/or mechanical properties of the product. Some of the physical and/or mechanical properties include rigidity, tensile strength, impact resistance, and water resistance (i.e. waterproofing). Some examples of the product may include an insulation material (e.g. for buildings), a packaging material (e.g. for food), a liquid-absorption material, a pot (e.g. for gardening), a cushioning material (e.g. for transportation), a kitchen accessory, or the like. Particularly, the liquid-absorption material may be cat litter or any other materials that absorb water, oil (e.g. petrol), and/or oil derivatives (e.g. gasoline, white spirit, or oil for automobiles). A concentration of the substance in the material may be in a range of 0 to 20%.

Figure 1A:
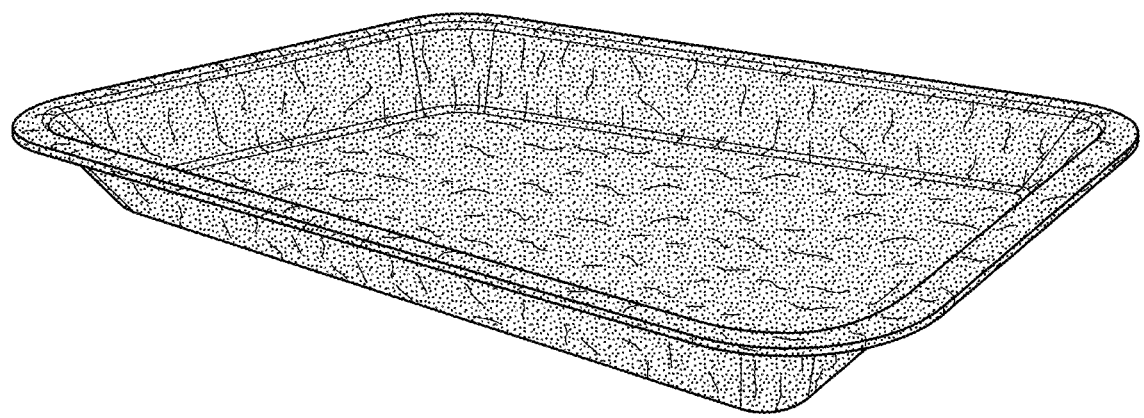
FIG. 1A depicts one embodiment of a product in a form of a plate.
Figure 1B:
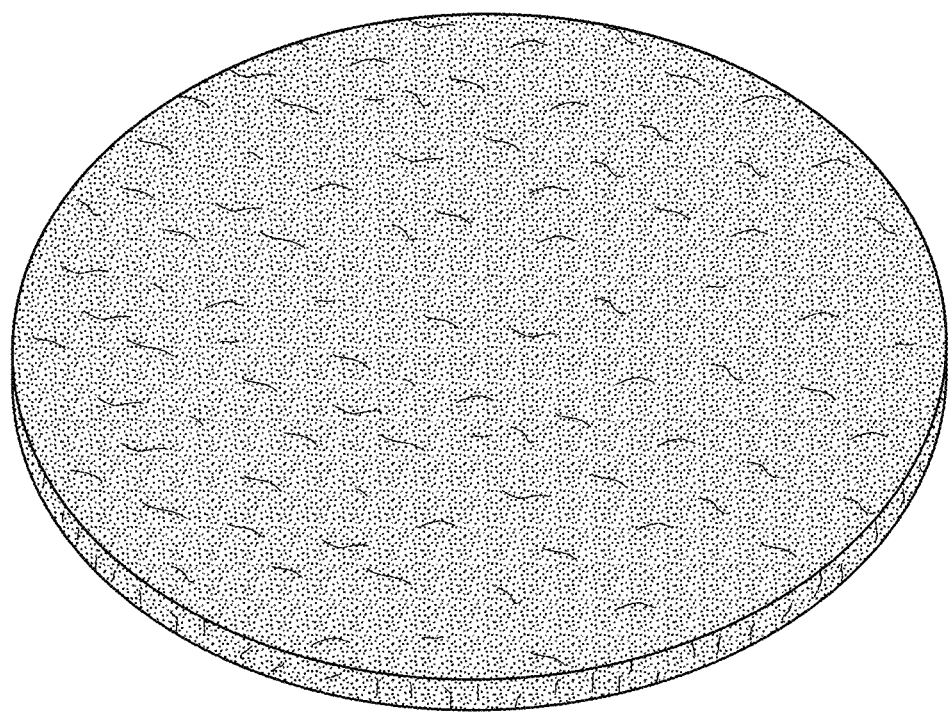
FIG. 1B depicts another embodiment of a product in a form of a disk.
Figure 1C:
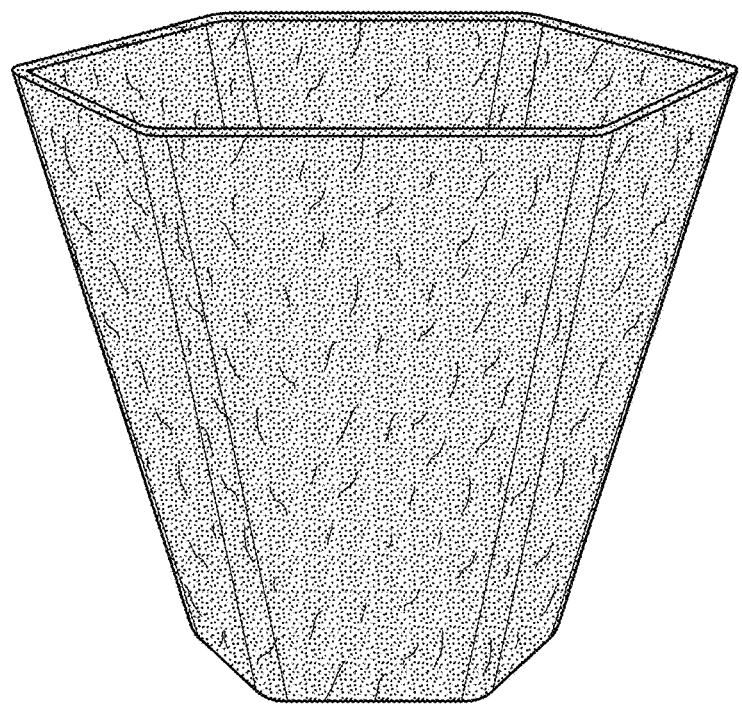
FIG. 1C depicts yet another embodiment of a product in a form of a pot.
Figure 1D:
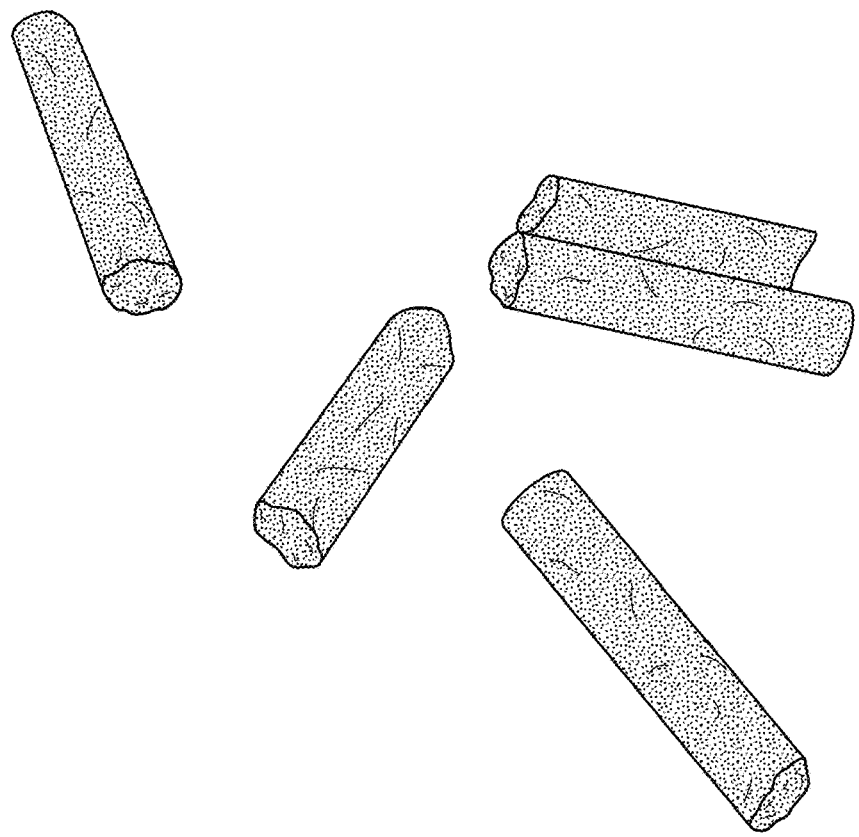
FIG. 1D depicts still yet another embodiment of a product in a form of a pellet.

FIGS. 1A to 1D depict exemplary products manufactured using the material described herein. Specifically, FIG. 1A depicts one embodiment of a product in a form of a plate. FIG. 1B depicts another embodiment of a product in a form of a disk. FIG. 1C depicts yet another embodiment of a product in a form of a pot. FIG. 1D depicts still yet another embodiment of a product in a form of a pellet. It is contemplated that the product may also be in any other desired forms in addition to those illustrated in FIGS. 1A to 1D.

Methods for harvesting and processing water hyacinth fibers are described in U.S. application Ser. No. 16/315,811, the disclosure of which is hereby incorporated by reference in its entirety. The length and width of the water hyacinth fibers may vary depending on an intended application of the water hyacinth fibers and/or the appearance of a desired finished product. The water hyacinth fibers may have a single or a binomial type size distribution.

Figure 2A:
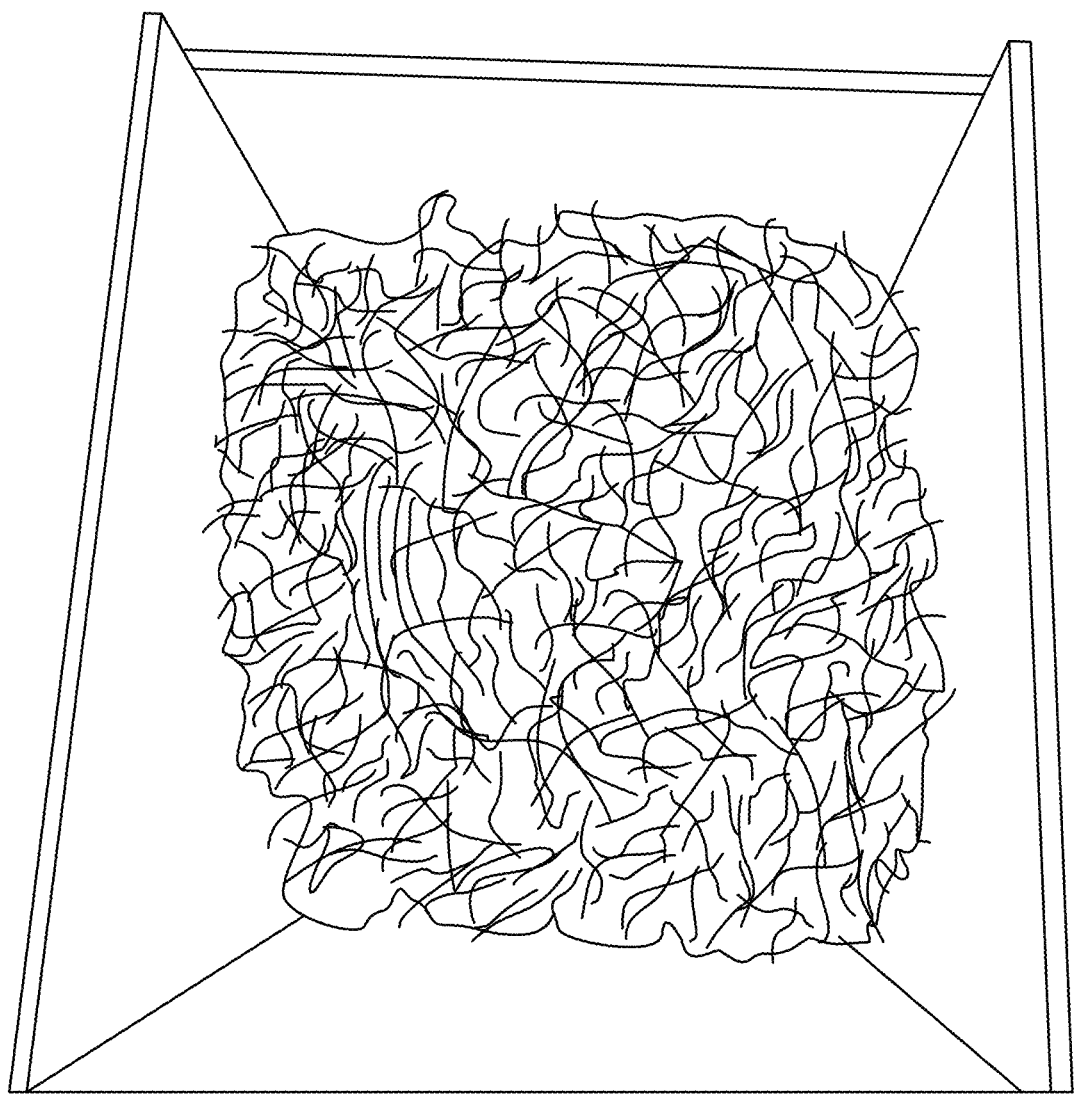
FIG. 2A depicts an exemplary long water hyacinth fiber according to one embodiment of the present disclosure.

FIG. 2A depicts an exemplary long water hyacinth fiber according to one embodiment of the present disclosure. For a long fiber, the length of the fiber may be in a range of 10 millimeter (mm) to 100 mm, and the width of the fiber may be in a range of 1 mm to 10 mm, or any other desirable length and width. Specifically, the long water hyacinth fiber shown in FIG. 2A may have a length of about 25 mm.

Figure 2B:
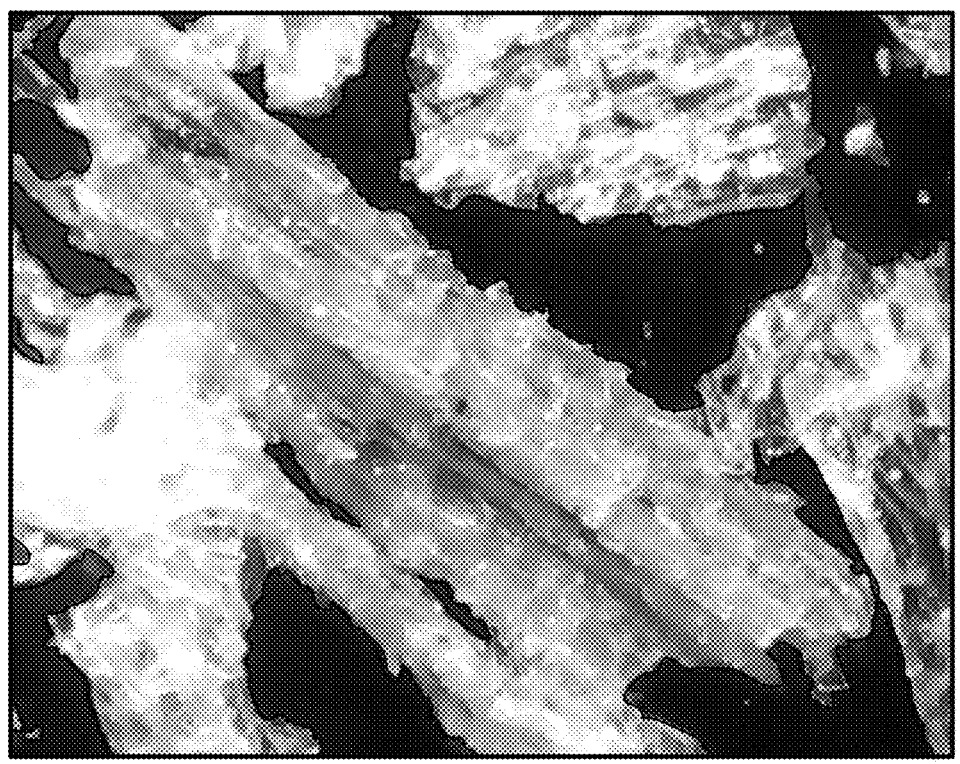
FIG. 2B depicts an exemplary short water hyacinth fiber according to another embodiment of the present disclosure.

FIG. 2B depicts an exemplary short water hyacinth fiber according to another embodiment of the present disclosure. For a short fiber, the length of the fiber may be in a range of 2 mm to 10 mm, and the width of the fiber may be in a range of 0.1 mm to 1 mm, or any other desirable length and width. Specifically, FIG. 2B shows a short water hyacinth fiber taken under a microscope, where the short water hyacinth fiber may have a length of about 5 mm.

Figure 2C:
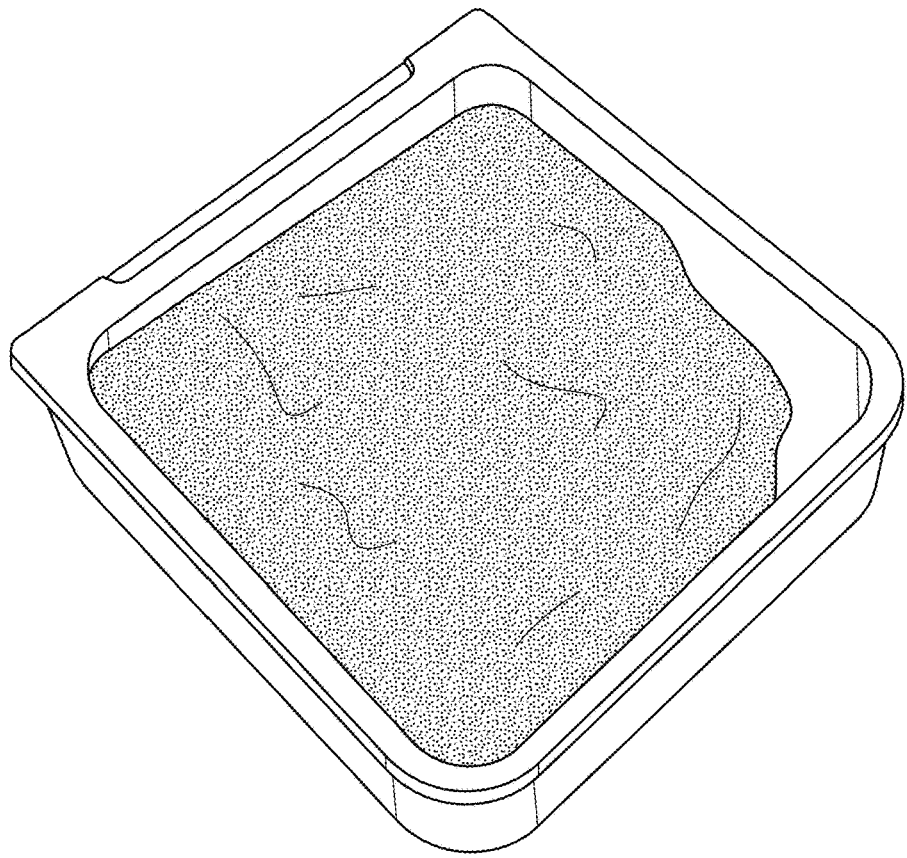
FIG. 2C depicts an exemplary very fine water hyacinth fiber according to yet another embodiment of the present disclosure.

FIG. 2C depicts an exemplary very fine water hyacinth fiber according to yet another embodiment of the present disclosure. For a very fine fiber (e.g. flour), the length of the fiber may be in a range of 100 micrometer (μm) to 2 mm, and the width of the fiber may be in a range of 25 μm to 150 μm, or any other desirable length and width. Specifically, the very fine water hyacinth fiber shown in FIG. 2C may have a length of about 2 mm.

According to a first embodiment of the present disclosure, the substance may be a thermoplastic. Some examples of the thermoplastic may include polyethylene (PE), polypropylene (PP), polyvinyl chloride (PVC), polystyrene (PS), acrylonitrile butadiene styrene (ABS), styrene acrylonitrile (SAN), acrylonitrile styrene acrylate (ASA), poly(methyl methacrylate) PMMA, polycarbonate (PC), polylactic acid (PLA), and polyhydroxyalkanoate (PHA). PE may be high-density PE (HDPE), low-density PE (LDPE), or linear low-density PE (LLDPE). PS may be high-impact PS (HIPS).

According to a second embodiment of the present disclosure, the substance may be a thermoset. Some examples of the thermoset may include polyesters, epoxides, aminoplasts, phenoplasts, ureaformaldehyde, and polyurethane.

According to a third embodiment of the present disclosure, the substance may be an elastomer. Some examples of the elastomer may include thermoplastic elastomers (TPE), styrene-butadiene-styrene (SBS), ethylene-vinyl acetate (EVA), rubber, polyisoprene, and silicones.

According to a fourth embodiment of the present disclosure, the substance may be an additive. Some examples of the additive may include a binding agent, a hydrophobic agent, a flame retardant, a fiber protection agent, a perfume, an aroma, a pigment, and a dye.

Specifically, the binding agent may include an oxygen group. In some embodiments, the binding agent may react with a free hydroxyl group (—OH) in the water hyacinth fiber, and some examples of the binding agent may include methylene diphenyl diisocyanate (MDI), toluene diisocyanate (TDI), formic acid, and acetic acid. In other embodiments, the binding agent may be a glue-type substance, and some examples of the binding agent may include starch, paraffin, polycyclopentadiene, polyethylene terephthalate (PET), and PP.

The hydrophobic agent may include, but not limited to, wax, carnauba, calendula, bee or soya beans, and paraffin. The flame retardant may include, but not limited to, ammonium polyphosphate and sulphate.

The fiber protection agent may include, but not limited to, permethrin, organic copper compounds, and pesticides. In some embodiments, the pesticides may be organochlorine pesticides, including, but not limited to, aldrin, chlordane, dichlorodiphenyldichloroethane (DDD), dichlorodiphenyldichloroethylene (DDE), dichlorodiphenyltrichloroethane (DDT), dichlofluanid, dieldrin, endrin, heptachlor, hexach-lorobenzene, lindane, and pentachlorophenol. In some other embodiments, the pesticides may be organophosphate pesticides, including, but not limited to, dimethoat, fenthion, parathion-methyl, parathion-ethyl, and phosalon. In yet some other embodiments, the pesticides may be pyrethroids, including, but not limited to, cypermethrin, lambda-cyhalothrin, and permethrin. The pesticides may further be benomyl, carbendazim, or prochloraz. The fiber protection agent may act against insects, mold, microorganisms, rodents, or the like.

According to a fifth embodiment of the present disclosure, the substance may be a combination of any of the thermoplastic, the thermoset, the elastomer, and the additive as described herein.

Figure 3:
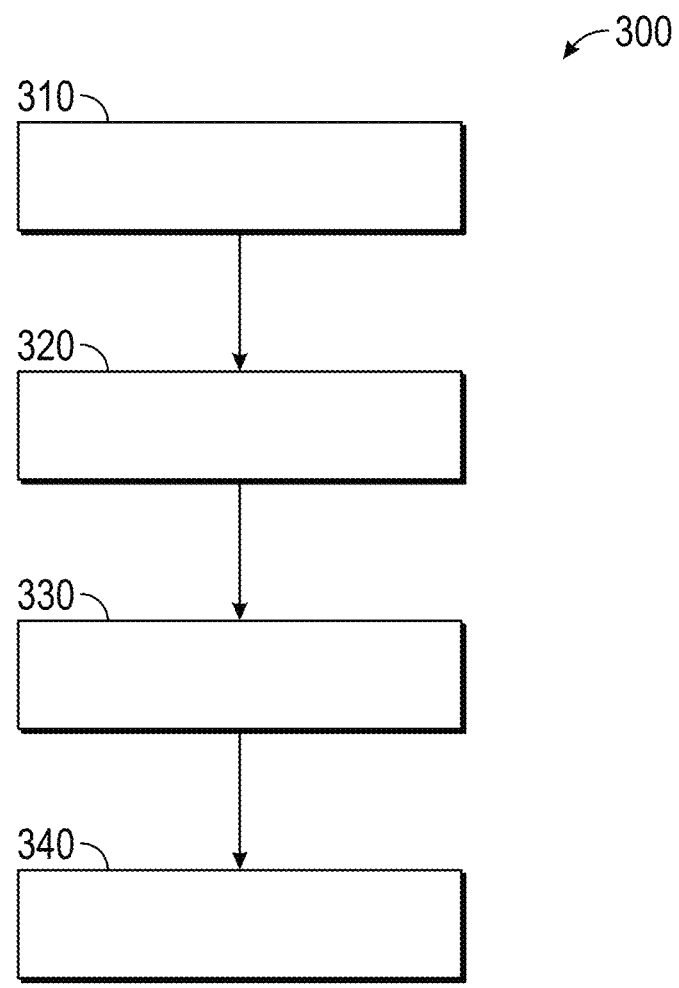
FIG. 3 depicts an exemplary block diagram illustrating a method for preparing the material as described herein.

According to one or more embodiments of the present disclosure, a method for preparing a material including water hyacinth fibers is described. FIG. 3 depicts an exemplary block diagram illustrating a method 300 for preparing the material as described herein. The material may be prepared by mixing a water hyacinth fiber with a substance. The water hyacinth fiber may have a single or a binomial type size distribution. The water hyacinth fiber may be a long fiber, with a length of the fiber in a range of 10 mm to 100 mm and a width of the fiber in a range of 1 mm to 10 mm, or any other desirable length and width. The water hyacinth fiber may be a short fiber, with a length of the fiber in a range of 2 mm to 10 mm and a width of the fiber in a range of 0.1 mm to 1 mm, or any other desirable length and width. The water hyacinth fiber may be a very fine fiber, with a length of the fiber in a range of 100 μm to 2 mm and a width of the fiber in a range of 25 μm to 150 μm, or any other desirable length and width.

The substance may be a thermoplastic, a thermoset, an elastomer, an additive, or any combination thereof. Specifically, the thermoplastic may be PE, PP, PVC, PS, ABS, SAN, ASA, PMMA, PC, PLA, or PHA. PE may be HDPE, LDPE, or LLDPE. PS may be HIPS. The thermoset may be polyesters, epoxides, aminoplasts, phenoplasts, ureaformaldehyde, or polyurethane. The elastomer may be TPE, SBS, EVA, rubber, polyisoprene, or silicones. The additive may be a binding agent, a hydrophobic agent, a flame retardant, a fiber protection agent, a perfume, an aroma, a pigment, or a dye. The binding agent may include an oxygen group. In some embodiments, the binding agent may react with a free hydroxyl group (—OH) in the water hyacinth fiber, and some examples of the binding agent may include MDI, TDI, formic acid, and acetic acid. In some other embodiments, the binding agent may be a glue-type substance, and some examples of the binding agent may include starch, paraffin, polycyclopentadiene, PET, and PP. The hydrophobic agent may include, but not limited to, wax, carnauba, calendula, bee or soya beans, and paraffin. The flame retardant may include, but not limited to, ammonium polyphosphate and sulphate. The fiber protection agent may include, but not limited to, permethrin, organic copper compounds, and pesticides. In some embodiments, the pesticides may be organochlorine pesticides, including, but not limited to, aldrin, chlordane, DDD, DDE, DDT, dichlofluanid, dieldrin, endrin, heptachlor, hexach-lorobenzene, lindane, and pentachlorophenol. In some other embodiments, the pesticides may be organophosphate pesticides, including, but not limited to, dimethoat, fenthion, parathion-methyl, parathion-ethyl, and phosalon. In yet some other embodiments, the pesticides may be pyrethroids, including, but not limited to, cypermethrin, lambda-cyhalothrin, and permethrin. The pesticides may further be benomyl, carbendazim, or prochloraz. The fiber protection agent may act against insects, mold, microorganisms, rodents, or the like.

Referring to FIG. 3, the method 300 may include a thermoforming process, which utilizes both heating and pressure techniques during the preparation of the material. Specifically, at step 310, the method 300 may include mixing a water hyacinth fiber with a substance, resulting a mixture of the water hyacinth fiber and the substance. A concentration of the substance in the mixture may be in a range of 0 to 20%.

At step 320, the method 300 may further include heating the mixture at a temperature. The temperature may be in a range of 140 to 220° C. or any other desired temperature. Possible effects of the heating may be that: when the temperature is above 120° C., hemicellulose in the water hyacinth fiber may begin decomposing (e.g. undergoing hydrolysis), generating at least one kind of sugar and releasing acetic acid; and when the temperature reaches around 160° C., the acetic acid may catalyze the degradation of lignin in the water hyacinth fiber. Free radicals may appear on lignin chains to trigger crosslinking via polycondensation reactions with other components in the cell walls of the water hyacinth fiber.

At step 330, the method 300 may also include pressing the mixture under a pressure over a time period. The pressure may be in a range of 0.1 to 10 bars or any other desired pressure. The time period for pressing the mixture may vary depending on a desired thickness of the material. In some embodiments, the time period may be in a range of 20 seconds (s) to 3 minutes (min) or any other desired time period. The mixture may be pressed using a double plate press, and a temperature of each plate of the double plate press may be controlled collectively or independently.

At step 340, the method 300 may further include cooling the mixture after pressing, resulting in the formation of the material including the water hyacinth fiber mixed with the substance. A thickness of the material may be in a range of 1 mm to 5 mm or any other desired thickness. The thickness of the material may vary depending on the pressure applied to the mixture at step 330 and/or an initial amount of the water hyacinth fiber used in the thermoforming process. In some embodiments, the material may include at least one layer of the water hyacinth fiber. Because the material is porous, vacuum may not be needed in the preparation of the material.

Due to the presence of the substance, the material may exhibit an enhanced physical and/or mechanical properties compared to the water hyacinth fiber alone. The material may be used to manufacture a product, including, but not limited to, an insulation material (e.g. for buildings), a packaging material (e.g. for food), a liquid-absorption material, a pot (e.g. for gardening), a cushioning material (e.g. for transportation), a kitchen accessory (e.g. meal trays or dish plates), or the like. Particularly, the liquid-absorption material may be cat litter or any other materials that absorb water, oil (e.g. petrol), and/or oil derivatives (e.g. gasoline, white spirit, or oil for automobiles). The product may be in a form of a plate, a disk, a pot, a pellet, or the like, as shown in FIGS. 1A to 1D.

In addition to the thermoforming process described herein, the material may also be prepared using other techniques, including, but not limited to, extrusion, injection, and calendaring.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Clause 1. A material comprising:
a water hyacinth fiber; and
a substance mixed with the water hyacinth fiber, wherein the substance is not polyurethane, and a concentration of the substance in the material is in a range of 0 to 20%.

Clause 2. The material of any clause herein, wherein the substance is a thermoplastic, a thermoset, an elastomer, an additive, or a combination thereof.

Clause 3. The material of any clause herein, wherein the thermoplastic is selected from the group consisting of polyethylene (PE), polypropylene (PP), polyvinyl chloride (PVC), polystyrene (PS), acrylonitrile butadiene styrene (ABS), styrene acrylonitrile (SAN), acrylonitrile styrene acrylate (ASA), poly(methyl methacrylate) PMMA, polycarbonate (PC), polylactic acid (PLA), and polyhydroxyalkanoate (PHA).

Clause 4. The material of any clause herein, wherein the thermoset is selected from the group consisting of polyesters, epoxides, aminoplasts, phenoplasts, and ureaformaldehyde.

Clause 5. The material of any clause herein, wherein the elastomer is selected from the group consisting of thermoplastic elastomers (TPE), styrene-butadiene-styrene (SBS), ethylene-vinyl acetate (EVA), rubber, polyisoprene, and silicones.

Clause 6. The material of any clause herein, wherein the additive is selected from the group consisting of a binding agent, a hydrophobic agent, a flame retardant, a fiber protection agent, a perfume, an aroma, a pigment, and a dye.

Clause 7. The material of any clause herein, wherein the binding agent includes an oxygen group.

Clause 8. The material of any clause herein, wherein the binding agent is selected from the group consisting of methylene diphenyl diisocyanate (MDI), toluene diisocyanate (TDI), formic acid, and acetic acid.

Clause 9. The material of any clause herein, wherein the binding agent is selected from the group consisting of starch, paraffin, polycyclopentadiene, polyethylene terephthalate (PET), and PP.

Clause 10. The material of any clause herein, wherein the hydrophobic agent is selected from the group consisting of wax, carnauba, calendula, bee beans, soya beans, and paraffin.

Clause 11. The material of any clause herein, wherein the fiber protection agent is selected from the group consisting of permethrin, organic copper compounds, and pesticides.

Clause 12. A method for preparing a material including water hyacinth fibers, the method comprising:

mixing a water hyacinth fiber with a substance, resulting a mixture of the water hyacinth fiber and the substance, wherein the substance is not polyurethane, and a concentration of the substance in the mixture is in a range of 0 to 20%;

heating the mixture at a temperature;

pressing the mixture under a pressure over a time period; and cooling the mixture.

Clause 13. The material of any clause herein, wherein the temperature is in a range of 140 to 220° C.

Clause 14. The material of any clause herein, wherein the pressure is in a range of 0.1 to 10 bars.

Clause 15. The material of any clause herein, wherein the time period is in a range of 20 seconds to 3 minutes.

Clause 16. The material of any clause herein, wherein the mixture is pressed using a double plate press and a temperature of each plate of the double plate press is controlled collectively or independently.

Clause 17. The material of any clause herein, wherein a thickness of the material is in a range of 1 mm to 5 mm.

Clause 18. The material of any clause herein, wherein the material includes at least one layer of the water hyacinth fiber.

Clause 19. A product including water hyacinth fibers, the product comprising:

a material including a water hyacinth fiber and a substance mixed with the water hyacinth fiber, wherein the substance is not polyurethane, and a concentration of the substance in the material is in a range of 0 to 20%.

Clause 20. The material of any clause herein, wherein the material is in a form of a plate, a disk, a pot, or a pellet.

The various aspects, embodiments, implementations, or features of the described embodiments can be used separately or in any combination. The embodiments disclosed herein are modular in nature and can be used in conjunction with or coupled to other embodiments.

Consistent with the above disclosure, the examples of assemblies enumerated in the following clauses are specifically contemplated and are intended as a non-limiting set of examples.

What is claimed is:

1. A material, comprising:
a water hyacinth fiber,
wherein the material has a water hyacinth fiber concentration of at least 80% of the water hyacinth fiber in the material; and
a substance mixed with the water hyacinth fiber,
wherein the substance is not polyurethane,
wherein the substance is an additive,
wherein the additive is selected from the group consisting of binding agents, hydrophobic agents, flame retardants, and fiber protection agents, and
wherein the material has a substance concentration of at most 20% of the substance in the material,
wherein the additive is a fiber protection agent, and
wherein the fiber protection agent is selected from the group consisting of permethrin, organic copper compounds, and pesticides.

2. A product including water hyacinth fibers, the product comprising:

a material including a water hyacinth fiber and a substance mixed with the water hyacinth fiber,
wherein the material has a water hyacinth fiber concentration of at least 80% of the water hyacinth fiber in the material,
wherein the substance is not polyurethane,
wherein the substance is an additive,
wherein the additive is selected from the group consisting of binding agents, hydrophobic agents, flame retardants, and fiber protection agents,
wherein the substance is a fiber protection agent,
wherein the fiber protection agent is selected from the group consisting of permethrin, organic copper compounds, and pesticides, and
wherein the material has a substance concentration of at most 20% of the substance in the material.

3. The product of claim 2,
wherein the material is in a form of a plate, a disk, a pot, or a pellet.

4. A method for preparing a material including water hyacinth fibers, the method comprising:

mixing a water hyacinth fiber with a substance, resulting a mixture of the water hyacinth fiber and the substance;

heating the mixture at a temperature;

pressing the mixture under a pressure over a time period; and cooling the mixture to form the material, wherein the material has a water hyacinth fiber concentration of at least 80% of the water hyacinth fiber in the material, wherein the substance is not polyurethane, wherein the substance is selected from the group consisting of binding agents, hydrophobic agents, flame retardants, and fiber protection agents, wherein the substance is a fiber protection agent, wherein the fiber protection agent is selected from the group consisting of permethrin, organic copper compounds, and pesticides, and wherein the material has a substance concentration of at most 20% of the substance in the material.

5. The method of claim 4, wherein the temperature is in a range of 140 to 220° C.

6. The method of claim 4, wherein the pressure is in a range of 0.1 to 10 bars.

7. The method of claim 4, wherein the time period is in a range of 20 seconds to 3 minutes.

8. The method of claim 4, wherein the mixture is pressed using a double plate press and a temperature of each plate of the double plate press is controlled collectively or independently.

9. The method of claim 4, wherein a thickness of the material is in a range of 1 mm to 5 mm.

10. The method of claim 4, wherein the material includes at least one layer of the water hyacinth fiber.

* * * * *